May 3, 1955   D. W. TERRY ET AL   2,707,303
APPARATUS AND MEANS FOR CLEANING POULTRY GIZZARDS
Filed Sept. 9, 1953   5 Sheets-Sheet 1
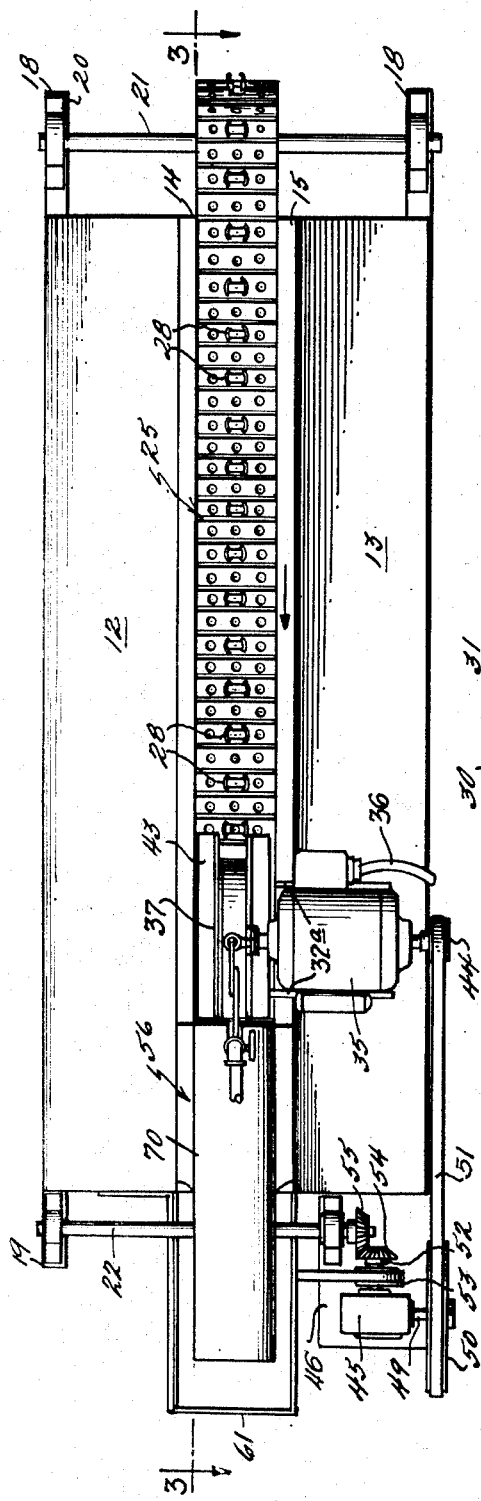
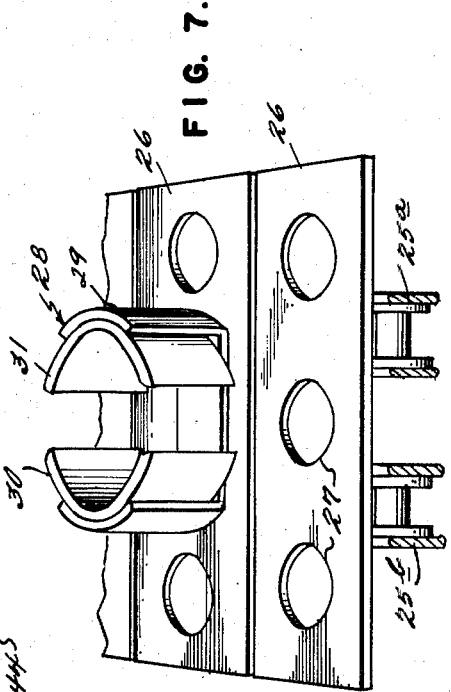
INVENTORS
DOYLE W. TERRY
TERRELL J. MELTON
BY
Semmes & Semmes
ATTORNEYS

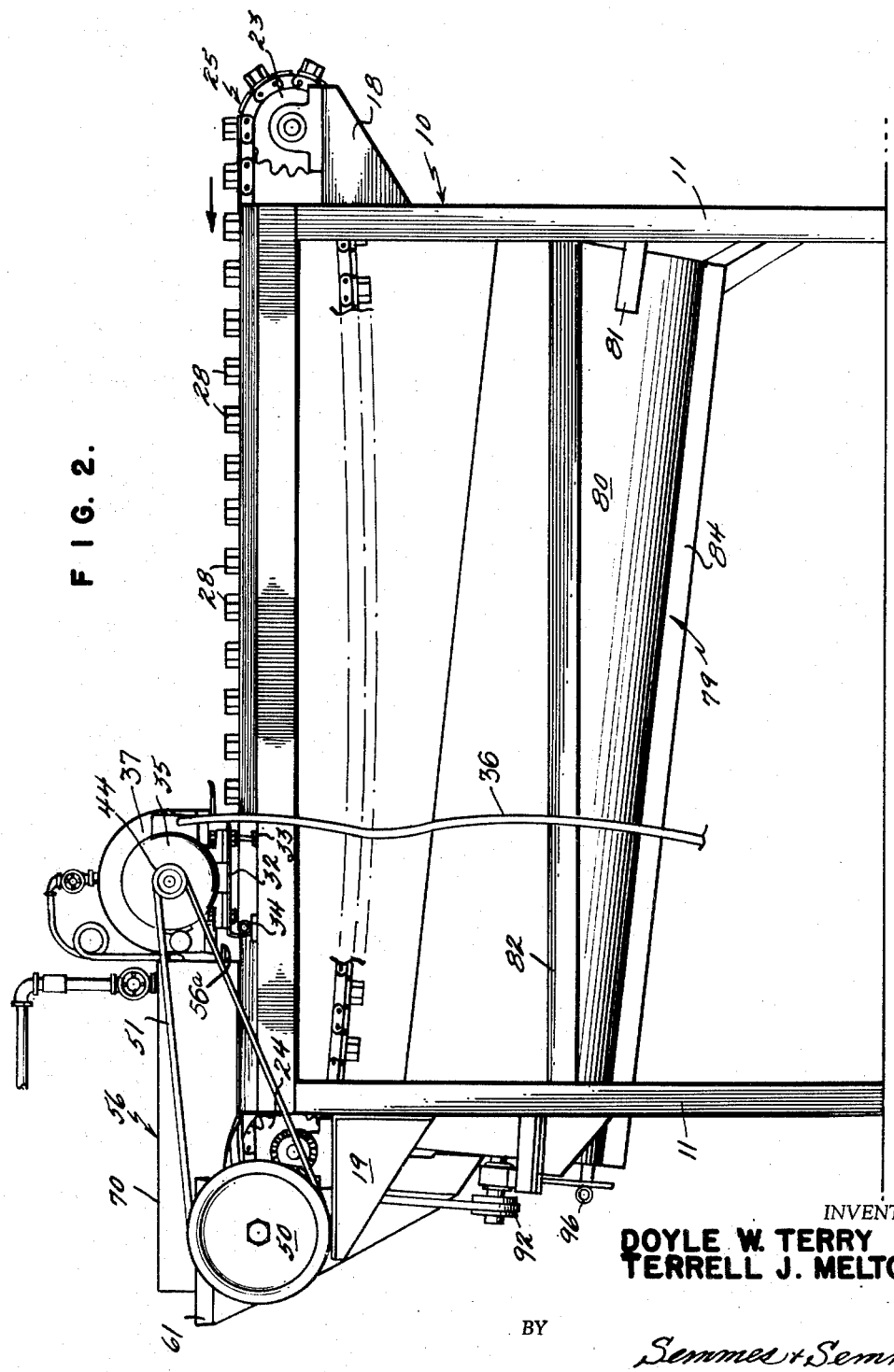

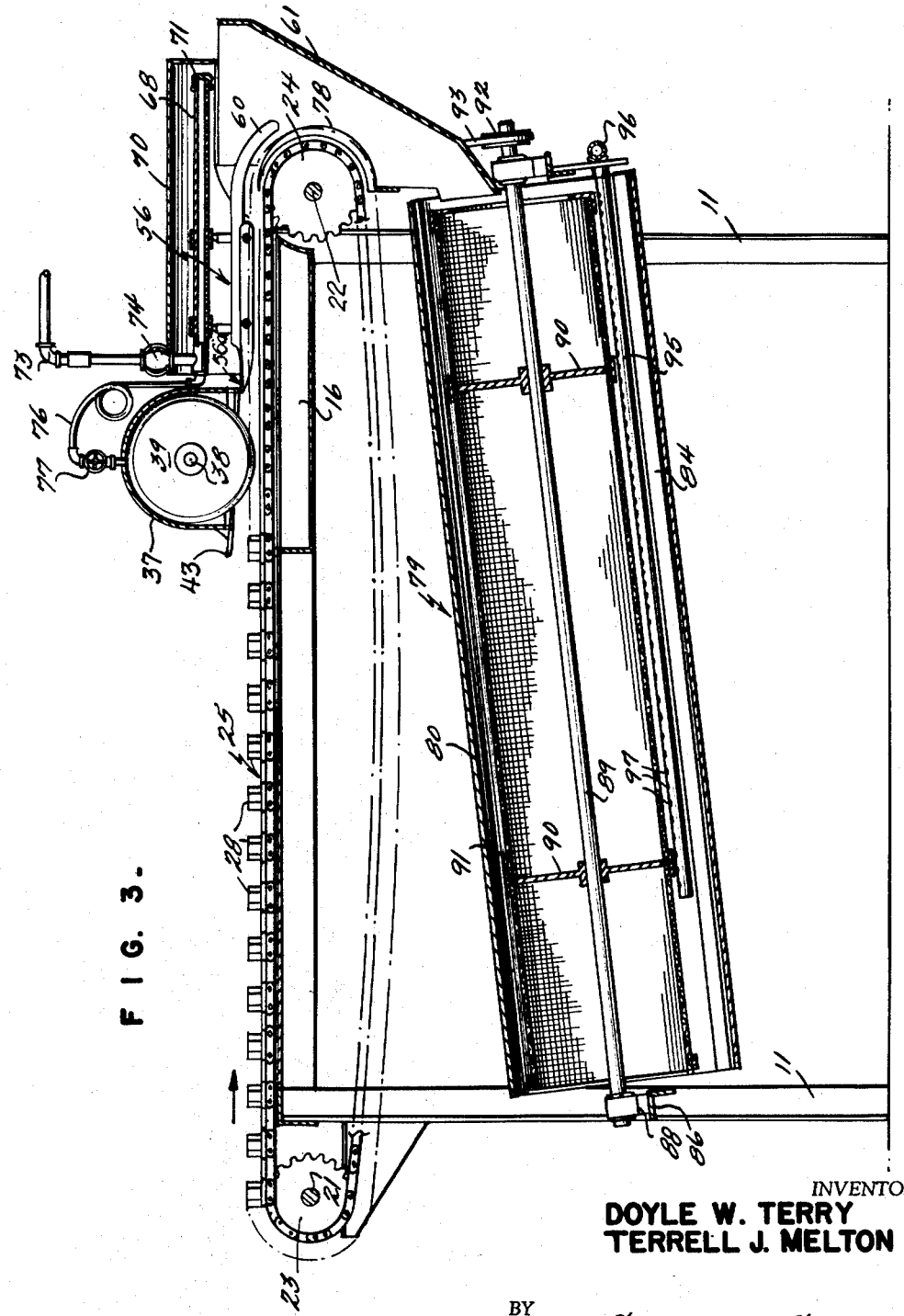

May 3, 1955  D. W. TERRY ET AL  2,707,303
APPARATUS AND MEANS FOR CLEANING POULTRY GIZZARDS
Filed Sept. 9, 1953  5 Sheets-Sheet 4
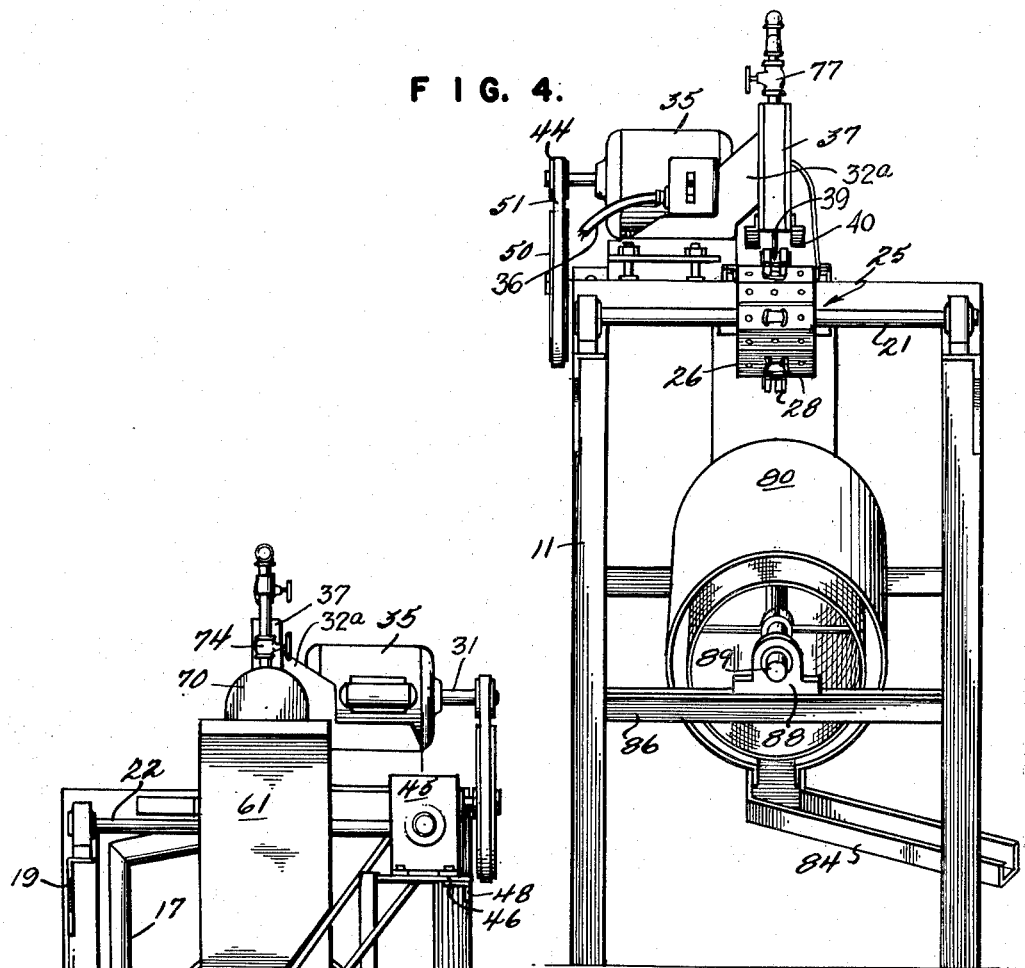
FIG. 4.
FIG. 5.
INVENTORS
DOYLE W. TERRY
TERRELL J. MELTON
BY 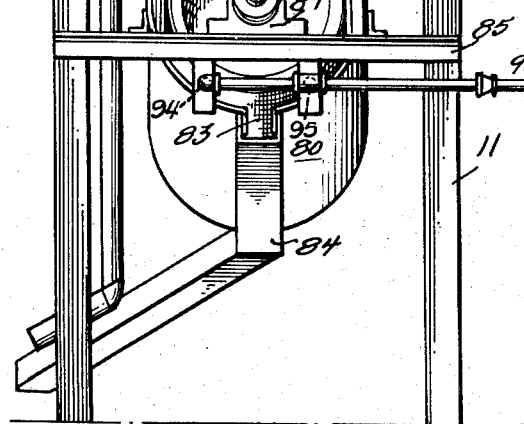
ATTORNEYS

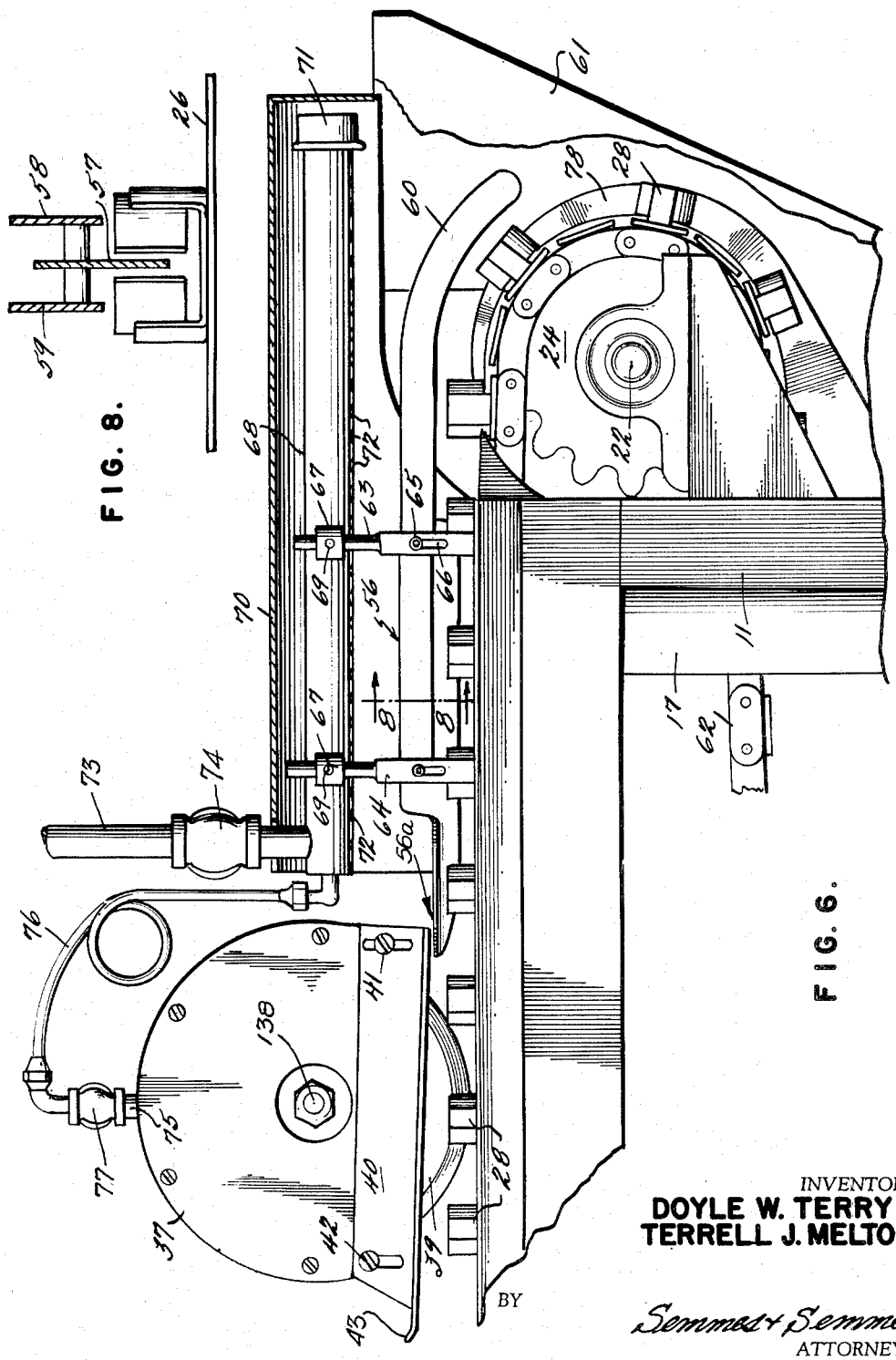

United States Patent Office 2,707,303
Patented May 3, 1955

2,707,303

APPARATUS AND MEANS FOR CLEANING POULTRY GIZZARDS

Doyle W. Terry and Terrell J. Melton, Athens, Ga.

Application September 9, 1953, Serial No. 379,122

11 Claims. (Cl. 17—11)

The present invention relates broadly to poultry packing and particularly to packing of chickens.

More specifically the present invention relates to a method and means for cutting and cleaning gizzards of poultry, particularly those of chickens, and contemplates means which automatically cut gizzards, then subject the gizzards to an initial washing, following which the gizzards are opened and spread while being subjected to a second washing preferably under the influence of high pressure water jets. Thereafter the gizzards as spread and partially cleaned are passed into a third wash or tumbling mechanism to complete the cleansing of the gizzards. The gizzards thereafter pass to conveying means for transporting to packaging devices.

In the poultry packing industry, there are a tremendous number of fowl which are processed each day and labor costs are a very important item. Devices and means have been used for automatically conveying the fowl to various stations where a sequence of operations are conducted such as deheading, plucking, cleaning and drawing, and final packing for shipment. There remains in the industry, however, a necessity for speeding the process of gizzard cleaning. This is a substantial need when it is considered that many thousands of fowl are processed each day. This has previously been unsatisfactorily effected by means of manual labor.

It is accordingly an object of the present invention to provide such means which will rapidly and efficiently cut and open gizzards and subject them to a series of washing operations so that at the end of their travel through the device, they are ready for immediate packaging, and after the gizzards are placed in the machine, no further manual labor is needed to complete the operation until they are discharged in a state for packing at the discharge end of the machine.

In accordance with the present invention, there is provided a conveyor system having a plurality of individual gizzard receiving cups and these cups are spaced apart in line with the direction of travel of the conveyor system. The gizzards, when placed in these cups, are subjected to a slitting action to slit the gizzards a predetermined distance through the thickness thereof. Washing means are applied to this rotary knife for cleansing and cooling the same during operation and for subjecting the gizzards to a first washing.

Following the slitting and initial washing of the gizzards, and still in line with the direction of movement of conveyor, there are combined spreading, depressing or retaining means adapted to be inserted in and spread the slit in the gizzard sufficiently to provide thorough cleansing thereof. At the same time each gizzard is passing under the retainer spreader, a pressurized water spray is jetted against the slit made in the gizzard for a second cleaning operation.

The slit and spread gizzards, following the second washing operation, are dropped into a hopper which thereafter directs the partially cleaned gizzards to a washing tumbler beneath the conveyor section of the device and streams of fluid are convergedly directed into the tumbler which consists of an inner wire mesh whereby, on rotation of the wire mesh, the streams more thoroughly cleanse the gizzards. The tumbler is preferably angularly disposed with respect to the conveyor system to facilitate tumbling and discharge.

Separate sources of water supply are utilized, of which one is adapted to feed pressurized water to the cutter and to that section of the conveyor where spreading and jet cleansing of the gizzards takes place. The second supply of water is adapted to direct streams convergedly in the outer fixed tumbler through the moving inner wire mesh thereof.

The slitting means for the gizzard, as contemplated by the present invention, consists in a circular knife or saw which is operable electrically, and related means are provided in conjunction therewith for holding of the gizzards in their individual cups during the slitting, spreading and cleansing operation until discharged into the tumbler.

The individual cups preferably comprise two semi-circular segments which are spaced apart with respect to one another and in line with the direction of the conveyor system. The circular slitting knife passes between the spacing of the sections forming the cups and is adapted to slit the gizzards from one-half to two-thirds through the thickness thereof. The spreader unit likewise plows substantially intermediately of the individual cup sections and blade means are provided in conjunction therewith for maintaining the gizzards in the cups in a slightly depressed and restrained position for facilitating proper spreading and cleansing.

Accordingly, the present invention is directed primarily to a completely automatic method of slitting and cleaning gizzards involving a plurality of sequential operations in which the gizzards are subjected to multiple washings and are discharged in a condition for immediate packing. The invention further contemplates a completely automatic apparatus for effecting the process of the present invention.

The method and apparatus of the present invention permit a substantial saving in time and labor costs in packaging and cleaning of gizzards and the apparatus is simple and inexpensive to construct and maintain.

Further objects and advantages of the present invention will be readily apparent from the following detailed description of an embodiment of the invention when taken together with the accompanying drawings in which:

Figure 1 is a top plan view of the overall apparatus of the present invention;

Figure 2 is a side elevational view of the apparatus of Figure 1 taken from one side thereof;

Figure 3 is a side elevational view of the apparatus of the invention on the opposite side with respect to Figure 2 taken along line 3—3 of Fig. 1;

Figure 4 is an end elevational view of the apparatus;

Figure 5 is an end elevational view of the opposite end with respect to Figure 4;

Figure 6 is a fragmentary enlarged side elevation view of a portion of the machine showing details of the cutting and spreading mechanism;

Figure 7 is a perspective view of a portion of the conveyor of the apparatus showing in detail the formation of a gizzard containing cup; and Figure 8 is an enlarged sectional view taken on the line 8—8 of Figure 6.

In the various views shown in the drawings, like reference characters refer to like parts and the following specification is to be read and understood in this light.

In the drawings a table generally designated at 10 has spaced vertical legs or uprights 11 and laterally spaced table or top portions 12 and 13. The two portions 12 and 13 are spaced by a channel 14 which is open at the bottom and has laterally extending flanges at 15 which serve as a support for a conveyor chain as will be apparent hereinafter. Extending longitudinally under at least a portion of the table is a trough 16 which opens into the channel 14 and has a discharge chute 17 leading therefrom. The purpose of the trough 16 and discharge chute 17 is to carry off wash water.

Brackets 18 and 19 are affixed at each end of the table and by means of bearing blocks 20 rotatably journal shafts 21 and 22. Centrally located on shaft 21 are spaced sprocket wheels 23 and corresponding sprocket wheels 24 are secured on shaft 22. Entrained over the sprocket wheels 23 and 24, and extending longitudinally of the table, is a conveyor chain 25 constructed of a plurality of linked sections as shown in Figs. 2 and 7. The conveyor chain, generally designated 25 in Fig. 2, actually consists of two spaced link chains 25a and 25b as seen in Fig. 7, each of which cooperates with one pair of sprocket wheels 23 and 24 which are laterally spaced with respect to one another. Mounted on top of the conveyor chains 25a and 25b are a plurality of contiguously arranged plates 26 having spaced openings 27 therein.

Surmounted over the central opening 27 of various ones of the plates 26, are gizzard holding cups 28 consisting of a bracket member 29 secured to the plate 26 and held thereby are semi-circular laterally spaced members 30 and 31. Preferably the members 30 and 31 are formed in an oval shape so as to accommodate the normal shape of a chicken or other fowl gizzard as by partially confining the object against displacement during conveyance. The plates 26 ride on, and are supported by, flanges 15 and the chain portions 25a and 25b extend downwardly into the open channel.

Mounted above the table there is a bracket 32, suspended by means of bolts such as at 33 and by a hinge at 34 which permits angular adjustment of the bracket 32 with respect to the table. The purpose of this angular adjustment is to permit adjusting the height slitting means for the gizzard as will be apparent from the following description.

This bracket 32 supports an electric motor 35 having an electrical connection 36 for attaching to a suitable electrical power source (not shown). Spaced flanges 32a on bracket 32 support a circular shaped housing 37 which is open at the bottom. The shaft 38 of the motor 35 has secured thereon a circular cutting blade 39 which extends downwardly through the open bottom of the circular housing into proximity with the top of the conveyor chain 25, and the blade 39 extends downwardly into the space between the half units 30 and 31 of the gizzard cups as can be seen from Fig. 6. On each side of the circular housing 37 there are guide and pressure plates 40, better seen in Fig. 6 and which are adjustably mounted thereon by means of screws at 41 and 42. The leading edge of the plates 40 are upturned as shown at 43.

The opposite end of shaft 38, as seen in Fig. 1, carries a belt pulley 44. A gear reduction mechanism, generally shown at 45, is mounted on a plate 46 secured adjacent one end of the table and supported by means of legs such as shown at 47 and flanges 48. The gear reduction box or mechanism has a shaft 49 extending therefrom and has a gear wheel or pulley 50 secured thereon.

A belt 51 is entrained over the pulley wheels 44 and 50 for driving the gear reduction mechanism from the motor 35 as desired. The take-off shaft 52 from the gear reduction mechanism 45, has a pulley 53 secured at one end and a bevel gear 54 at the other end of the shaft. The shaft 22 has a bevel gear 55 which mates with, and coacts with, the bevel gear 54 so that upon actuation and rotation of the motor 35, the shaft 22 will be driven through belt 51, pulley 50, reduction means 45, shaft 52, bevel gear 54, and bevel gear 55. Thereupon the sprocket wheels 24 will drive the individual chain units 25a and 25b to thereby move the cups 28 longitudinally over the spaced table sections 12 and 13 to convey gizzards to the circular knife or saw 39. In so doing, the gizzards will first be contacted by the upturned ends 43 of the guide and pressure plates 40 and while being progressively increasingly pressed and confined will be slit to between one-half and two-thirds through the thickness thereof by the circular blade 39. Slitting in this manner avoids rupture and bruising of walls of the gizzard and uneven separation because there is thus no forced jamming of the gizzard against the confining means or any other retaining means. It is to be understood that the word "slitting" hereinafter refers to rotary knifing or rotary sawing as opposed to fixed cutting or cleaving.

Spaced behind the circular blade 39 in the direction of movement of the conveyor 25, there is a combined retainer and spreader unit generally indicated at 56. See Figs. 3 and 8. It will be noted that spreader unit 56 comprises a plow member 56a having a substantially flat top as shown, an apex in line with the slitting member 39, sides diverging from the apex to which blades or skids 58 and 59 are attached. This unit includes a centrally disposed retaining blade or skid member 57 which fits in between the two half units 30 and 31 forming the gizzard cups 28 and is pointed at its forward end. This central retaining member 57 has spaced on either side thereof, and in a higher plane than the lower edge thereof, the spreader blades 58 and 59. The purpose of the member 56 including the central retaining member 57, and spreader blades 58 and 59, is to spread and simultaneously compress the gizzards after the initial slitting by the circular blade 39 as they pass along in their line of travel over the table so that they are spread and opened in the cups for reasons to appear hereinafter. The spreader blades 58 and 59, as shown in Fig. 6, are curved at their rear ends, as shown at 60, and extend around a portion of the bend where the conveyor chain is entrained over the sprocket wheels 24 for maintaining the cut and open gizzards in position in the gizzard cups.

Aft of this spreader mechanism is a trough 61, into which the slit, opened, and spread gizzards are discharged as the conveyor chain and, accordingly, the gizzard cups 28, pass around the sprocket wheel on their return path under the table as shown at 62.

The spreader blades 58 and 59, as also the central retaining member 57, are mounted on top of the table by means of posts 63 and 64 together with bolts 65 operable in slots 66 so that the various members can be adjusted as to height with respect to one another, and also with respect to the gizzard cups 28 passing thereunder. The upper ends of posts 63 and 64 support, by means of brackets 67, a pipe extending longitudinally above the spreader unit 56. The brackets 67 are vertically adjustable and can be secured by any known means such as generally designated at 69 which may consist of set screws or the like. A shield 70 is mounted over and surrounds the top and sides of the pipe 68. The rear end of pipe 68 is closed by a cap 71.

The under side of pipe 68 has a plurality of longitudinally spaced holes or openings 72 therein. These holes or openings 72 extend along directly above the spreader unit 56. They are adapted for spraying jets of pressurized water down onto the spreader unit for cleansing thereof and also of the gizzards which have been slit, spread and retained with opposed portions of the muscular walls of the gizzard and the opposed portions of the horny inner lining exposed. An inlet pipe 73 is connected into pipe 68 and extends to a suitable source of water supply under pressure. A valve generally designated 74 is for the purpose of controlling the flow and pressure of the water in pipe 68 from the inlet pipe 73. A water spray is inserted in the top of circular housing 37, as shown at 75, and is interconnected to pipe 68 by means of a pipe 76 which is controlled by a valve 77 as shown in Fig. 3. The purpose of the spray 75 is to permit a spray of water to wash and cool blade 39, and at the same time, to initially cleanse gizzards passing beneath the blade prior to reaching the second washing stage or operation under the pipe 68 after the gizzards have been spread by means of the spreader unit 56.

Positioned aft of the spreader unit 56 and in the area where the conveyor chain starts to circle around the sprocket 24, there is a stationary curved ejector blade 78 secured to the mechanism and which has a curved leading edge which is positioned in proximity to the base of the gizzard cups 28 and adapted to pass between the two half units 30 and 31. As a gizzard cup 28 passes under ejector blade 78, the ejector blade will forcibly eject the gizzard from the gizzard cup. During a greater portion of movement of the individual cups around sprocket 24, the gizzards will be maintained in position in the cups by virtue of the curved ends 60 of the spreader unit.

Positioned below the table, there is a tumbling and washing device 79 which consists of a fixed exterior drum 80 secured to the frame as by angle irons 81 fixed to leg 11. If desired they can also be secured to longitudinal stringer members 82 in any known manner. This fixed drum, as shown in Figure 5, has a longitudinally extending slot in the base thereof shown at 83 which empties into a trough 84 for discharging water as will appear later. End cross braces 85 and 86 are secured on the upright posts 11 and mount journal bearings 87 and 88, respectively. It is to be noted that the end cross brace 85 is higher on the legs 11 than is the end cross brace 86. The journal bearings 87 and 88 rotatably support a shaft 89 and this is inclined as shown in Fig. 3 of the drawings. Mounted on the shaft 89 are a plurality of spiders or webs 90 which support, at their outer edges or ends, a wire mesh drum 91 of cylindrical configuration which, as shown in Fig. 3, is mounted internally of the fixed drum 80. The wire mesh interior drum 91 can be rotated with respect to fixed drum 80 by means of a pulley 92 mounted on the upper end of shaft 89 and a belt 93 entrained over pulley 92 and interconnected with pulley 53 shown in Fig. 1. It will accordingly be seen that upon rotation of motor 35, the shaft 89 and the wire mesh tumbler 91 will be rotated internally of the fixed drum 80 through the speed reduction mechanism 45.

Arranged internally of fixed drum 80, and between the inner wall thereof and the mesh drum 91, and extending substantially parallel therewith, are two spaced longitudinally extending pipes 94 and 95 which are closed at one end and at the upper other end thereof are secured into and connected into a lead in pipe 96 which is attached to a suitable supply of water. The pipes have a plurality of holes 97 extending therealong. The holes 97 on the two pipes 94 and 95 are so arranged as to direct converging streams of water into and through the rotatable wire mesh drum 91 so as to permit washing of the gizzards being tumbled through the tumbling device. This effects a third washing of the slit and spread and partially cleaned gizzards. The gizzards, after passing through the tumbler, are discharged at the lower discharge end of the device and thereafter can be conveyed by any desired means to packaging devices.

It is to be noted that the tumbling mechanism is angularly disposed with respect to the conveyor system and two separate sources of water supply are provided. The first source of water supply is adapted to feed pressurized water to the circular blade and to that section of the conveyor where the gizzards are spread by the spreader. The second supply of water directs converging streams in the fixed drum of the tumbler through the moving wire mesh drum therein.

The construction of the present device will be apparent from the foregoing detailed description of an embodiment thereof, although it is to be understood that modifications of minor details can be readily made by those skilled in the art to which the present invention pertains without departing from the scope and spirit of the present invention.

In operation, the apparatus and the method function as follows: Gizzards which have been removed from dressed and drawn fowl are placed by operators into the gizzard cups 28 to partially confine the gizzards on the conveyor 25 which is travelling in the direction shown by the arrows of Figs. 2 and 3, as these gizzard cups are moved along carrying the gizzards with them, the latter are first contacted by the upturned end 43 of the guide and pressure plates 40 which tend to compress them slightly and press them firmly into the individual gizzard cups 28. They are then contacted by the blade 39 which is rotating at a relatively high rate of speed. The blade passes between the two half units 30 and 31 of the gizzard cups 28 and slits each gizzard between one-half and two-thirds of its depth. The depth of slitting can be controlled by vertical adjustment of shaft 38 carrying the knife blade 39. After this slitting operation, they are then passed to the retaining spreader unit, but before reaching this position, they are given an initial washing due to the spray 75 which not only serves as the initial gizzard washing means but also serves to cool and wash the blade 39.

Upon reaching the retaining and spreader unit 56 they are spread, and at the same time, compressed into the cups 28. During their entire travel through this section, the gizzards, while being spread, are subjected to a spray of water through the holes or openings 72 in pipe 68 which constitutes a second washing of the gizzards. The gizzards are then discharged or forcibly ejected from the individual gizzard cups 28 by means of the curved ejector blade 78 and thereupon dropped into the hopper 61 which discharges into the tumbler and washing device generally shown at 79.

Rotation of the wire mesh drum 91, as set forth hereinbefore, causes the gizzards, which have been slit and initially washed; spread and given a second washing; to be tumbled downwardly along the inclined tumbler from the entrance end to the discharge end. During this tumbling operation, the gizzards are subjected to a third washing by means of jets or streams of water convergedly spraying into the wire mesh drum from openings 97 in pipes 95 and 94. Following the third washing, the thoroughly cleaned gizzards are discharged from the drum and then carried or conveyed to packaging stations for placing in any desired packages and to then be placed in the fowl prior to final packing thereof.

It will be seen from the foregoing detailed description that the present device provides a simple and yet highly effective automatic mechanism for slitting and cleaning gizzards of fowl, and particularly chickens, and which subjects the gizzards to three separate washing operations while advancing through different stages of treatment including slitting; spreading of the gizzards to insure better cleaning; and then tumbling through a combined open-mesh tumbler and washing apparatus. This apparatus permits an extremely large number of gizzards to be adequately slit and cleaned contrary to hitherto known methods and apparatus. It will also be apparent that various control means have been shown which permit adjustment for different sizes and conditions of gizzards as also for individual control of the different washing operations. The speed of the overall device can be readily controlled by the operators at will.

Application of the teachings of the invention is not limited to the specific device illustrated in the drawing, and it will be apparent that minor modifications or equivalent methods for practicing the invention will be apparent to those skilled in the art.

What is claimed is:

1. A device for the preparation of poultry gizzards and the like comprising: movably supported gizzard conveyor means including open top partial confining means for partially confining and maintaining each gizzard in an upright position; slitting means positioned in coacting relation with said confining means to slit each gizzard from outside-in, thereby to partially divide opposed muscular walls of the upright gizzard and portions of the inner lining therewith, said conveyor means being movable to pass the confining means in working relation to said slitting means; an elongated spreader unit mounted sequentially adjacent said slitting means, and drive means engaging said conveyor means to actuate same.

2. The device according to claim 1 further comprising guide and pressure means secured adjacent to the slitting means, said guide and pressure means coacting with the slitting means to slidably hold confined gizzards during slitting thereof.

3. The device according to claim 1 wherein said spreader unit comprises a plow to spread slit walls of gizzards; blade means extending from the plow engageable with partially confined, spread gizzards, to hold down the walls thereof during cleaning.

4. The device according to claim 3 further comprising a fluid expressing unit supported adjacent the spreader unit for impacting cleaning fluids against spread and held down portions of partially confined gizzards.

5. The device according to claim 3 wherein said blade means includes at least two parallel fixed skids rearwardly adjacent the plow, each said skid engaging exposed walls of the gizzards immediately succeeding plowing to hold down said walls during cleaning.

6. The device according to claim 5 further comprising a third skid fixed intermediate and parallel said parallel skids to engage the vertex of each gizzard during passage through a cleaning station and while the inner walls of the gizzards are exposed and held down by the other skids.

7. The device according to claim 1 in which the confining means includes corresponding gizzard confining cup segments secured to the conveyor in laterally spaced apart relation to partially confine gizzards upright for slitting.

8. A device according to claim 7 further comprising an elongated spreader unit support sequentially adjacent said slitting means, said spreader unit comprising a plow to spread slit walls of gizzards; skid means extending from the plow engageable with the partially confined and spread gizzards to hold down walls thereof during cleaning.

9. The device according to claim 8 including gizzard ejector means fixedly supported sequentially adjacent the spreader unit, said ejector providing means for the gradual release from confinement of gizzards sequentially with spreading thereof.

10. The device according to claim 1 including gizzard ejector means fixedly supported rearwardly adjacent the slitting means, said ejector means providing means for the gradual release from confinement of the gizzards sequentially with the slitting thereof.

11. The device according to claim 10 including the improvement comprising: an open-mesh gizzard tumbling tube mounted upon the device to receive gizzards just discharged from the confining means; fluid pressure means mounted adjacent the tube having converging outlets for expressing cleaning fluid against the tumbling gizzards in converging directions, thereby to remove residual deposits from all surfaces thereof, means associated with the tube providing rotary power to the tube and means for introducing cleaning fluid to the fluid pressure means.

References Cited in the file of this patent

UNITED STATES PATENTS

| | | |
|---|---|---|
| 1,383,162 | Sprague | June 28, 1921 |
| 1,901,042 | Robbins | Mar. 14, 1933 |
| 2,455,675 | Hawk | Dec. 7, 1948 |
| 2,620,510 | Darrow et al. | Dec. 9, 1952 |
| 2,641,020 | Clemens et al. | June 9, 1953 |
| 2,657,424 | Biddinger et al. | Nov. 3, 1953 |
| 2,660,756 | Darrow et al. | Dec. 1, 1953 |
| 2,663,899 | Biddinger et al. | Dec. 29, 1953 |
| 2,695,418 | Patterson et al. | Nov. 30, 1954 |